United States Patent [19]
Kolkman

[11] Patent Number: 4,652,986
[45] Date of Patent: Mar. 24, 1987

[54] VITAL INVERTER DRIVER

[75] Inventor: Dick J. Kolkman, Gibsonia, Pa.

[73] Assignee: American Standard Inc., North Hills, Pa.

[21] Appl. No.: 826,949

[22] Filed: Apr. 7, 1986

[51] Int. Cl.$^4$ ............................................. H02H 7/122
[52] U.S. Cl. ......................................... 363/56; 363/97; 363/131; 361/87
[58] Field of Search ................. 363/55, 56, 95, 97–98, 363/131–134; 361/87, 93, 100

[56] References Cited

U.S. PATENT DOCUMENTS

| | | | |
|---|---|---|---|
| 3,930,194 | 12/1975 | Walker | 363/56 |
| 4,150,424 | 4/1979 | Nuechterlein | 363/56 X |
| 4,477,867 | 10/1984 | Pellegrino | 363/56 X |
| 4,574,342 | 3/1986 | Runyan | 363/97 X |

*Primary Examiner*—Peter S. Wong
*Attorney, Agent, or Firm*—G. E. Hawranko

[57] ABSTRACT

A vital inverter driver includes an oscillator which, upon energization, outputs a signal of predetermined frequency to two identical parallel-arranged counter circuits, which step down the oscillator output to the desired frequency. One counter output is fed to an inverting amplifier, while the other is coupled to a noninverting amplifier, thereby resulting in output count signals of identical frequency and amplitude but being 180° out of phase. A summing circuit, having two series-resistance arrangements with different resistance values for weighting purposes, and a summing transformer passes a signal of a predetermined magnitude through an overload protection device which could be a fuse or a breaker, when the output count signals are 180° out of phase. When the count signals are other than 180° out of phase, a failure in circuitry or operation has likely occurred, and the signal output from the summing circuit exceeds the predetermined magnitude and activates the overload protection device.

20 Claims, 8 Drawing Figures

VITAL INVERTER DRIVER

BACKGROUND OF THE INVENTION

This invention relates to a vital inverter driver, especially of the type utilized in railroad signalling installations where the conversion to a.c. power from a d.c. battery source must be made within a tight frequency tolerance. Because of the vitality required of the overall railroad signalling installation and thus the a.c. power devices associated therewith, such as, for example, a.c. track circuits, communication/carrier equipment, and other phase selective devices; such vitality is also required of the inverter driver whereby, in the event of a drifting away from the tolerance of the frequency, the output of the vital inverter driver is immediately shut down. Some typical vital inverter drivers have used a vibrating reed-type oscillator by which is established the frequency of the output voltage. Though accurate, such vibrating reed-type oscillators are expensive, difficult to obtain, and are limited in application to only the one selected frequency. Additionally, vital power inverters which have used this vibrating reed-type oscillator have relied on the integrity of the frequency output as a means of shutting down the devices to which the inverter is supplying power; that is, any frequency drift resulted in a shutdown of the powered phase selective device and not of the inverter itself.

SUMMARY OF THE INVENTION

It is, therefore, an object of the invention to provide a vital power inverter using readily available components and simplified manufacture and maintenance operations.

It is a further object of the invention to provide such a vital power inverter which, by simple means, can be modified to provide a number of different frequency voltage outputs.

It is yet a further object of the invention to provide such a vital power inverter that, in the event of a drift away from the desired frequency beyond a predetermined tolerance, the output of the vital power inverter itself is interrupted.

Briefly, the invention consists of a crystal-type oscillator, the output of which is first fed through a series tuned filter and then passed simultaneously to two distinct, yet substantially similar, counter circuits. The output of one counter circuit is fed to a noninverting amplifier while the output of the second counter circuit is fed to an inverting amplifier, thereby resulting in the two output signals being of equal frequency and amplitude but being 180° out of phase. The outputs of each of these amplifiers is then fed to respective first and second transistor driver arrangements associated with each counter circuit. The emitter junctions of the transistor portions of the respective transistor driver arrangements are fed to respective first and second series-resistance arrangements which differ in resistive value such that, the signal from one of the counter circuits is weighted to allow a more positive voltage than the other output signal. From the first and second series-resistance arrangements, the outputs are then fed to the primary winding of a summing transformer; the two outputs are effectively summed thereby, and a low current rated fuse is connected on the secondary winding of the transformer. It can be appreciated that when the counter output signals are properly synchronized, the two signals will sum to a total value in favor of the weighted counter signal output only since the signals will be 180° out of phase. Should frequency drift occur, the effective summed output signal will be greater than the weighted output signal value, thereby blowing the fuse and shutting the vital power inverter down.

DESCRIPTION AND OPERATION

Figure 1:
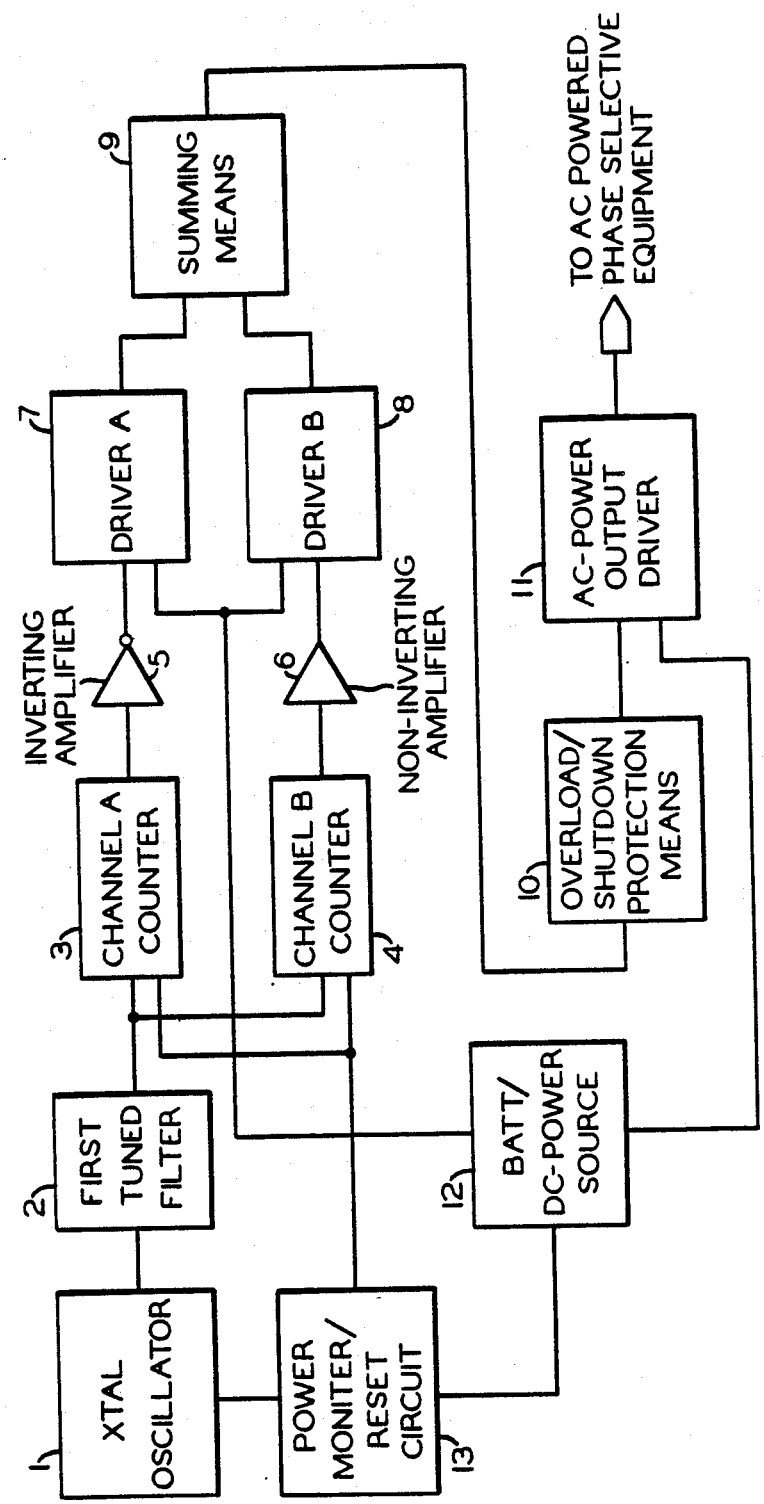
FIG. 1 is an elevational view, in block diagram form, of the vital power inverter constructed in accordance with the invention.

As seen in FIG. 1, the vital power inverter includes a crystal oscillator, shown generally as reference 1, which can be a tuning fork-type crystal oscillator, as will be described in further detail in reference to FIG. 2. The output of the crystal oscillator 1 is coupled to a first series tuned filter 2, which serves to monitor the integrity of the crystal oscillator 1. This can best be illustrated, by way of example, where a 60 kilohertz oscillator output can be monitored to within 1200 hertz tolerance of the desired frequency of the crystal oscillator 1. The series-tuned filter 2 will also contain an AND gate mechanism which ensures that in the event of a greater than 1200 hertz drift away from the desired crystal oscillator frequency, a signal of reducing voltage is presented to the AND gate until such signal falls below the triggering voltage of the AND gate and a zero (0) output will result therefrom, effectively shutting down the vital power inverter.

The series tuned filter 2 will couple the crystal oscillator output to an input of both a first and a second counter circuit 3, 4 simultaneously such that, the counter circuits 3, 4 are synchronized in their respective counts. By way of count selecting jumpers, which comprise a portion of each counter circuit and which will be described hereinafter in further detail, both the first and second counter circuits can be modified to provide different valued counter outputs and, hence, a.c. voltage outputs of different selectable frequencies.

The outputs of both the first and second counter circuits 3, 4, which can further be distinguished by channel designations A and B as seen in FIG. 1, are coupled to an inverting and a noninverting amplifier 5, 6, respectively. The effect of the inverting amplifier 5 on the first counter circuit channel A is to invert the counter output such that, the count output is not only stepped down in frequency by the first counter circuit 3 but is also shifted 180° out of phase with the count input from the crystal oscillator circuit 1. Similarly, the output of the second counter circuit 4 is stepped down in frequency; however, no phase shift or inversion occurs here, thereby resulting in the output of the second counter circuit 4 being in phase with the crystal oscillator circuit 1, but being 180° out of phase with the output of the first counter circuit 3. In this manner, it can be appreciated that under desired operating conditions and with the count-selecting jumpers for both the first and second counter circuits 3, 4 identically arranged, the outputs of the first and second counter circuits 3, 4, following coupling through the inverting and noninverting amplifiers 5, 6, will be identical but out of phase by 180°.

The inverted output count signal from the first counter circuit 3 and the noninverted count signal from the second counter circuit 4 are each coupled to separate drive circuits, shown in FIG. 1 as drive circuit A (designated reference number 7) and as drive circuit B (designated reference number 8). The two drive circuits A and B function to condition the outputs from the first and second counter circuits 3 and 4 for simultaneous coupling to a summing circuit, shown representatively as the summing means (block 9 of FIG. 1.). The summing means 9 first conditions the output signals such that, one signal is weighted differently than the other; that is, one output count signal will be of greater magnitude than the other, the summing means then algebraically adds the inverted circuit signal output of the first counter circuit 3 and the noninverted count signal output of the second counter circuit 4, which two count circuits are graphically represented by FIGS. 5b and 5c, and outputs a summed count signal graphically illustrated in FIG. 5d.

Figure 5A:
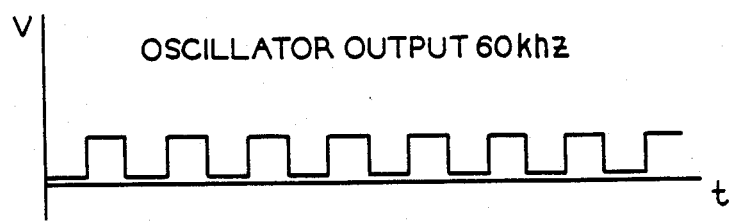
FIG. 5a is a graphical representation of the crystal oscillator circuit output.
Figure 5B:
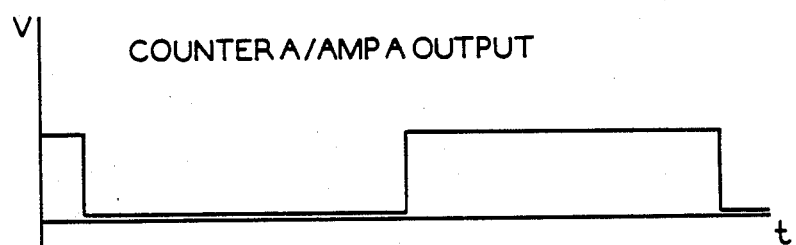
FIG. 5b is a graphical representation of the output of the first counter/amplifier circuit.
Figure 5C:
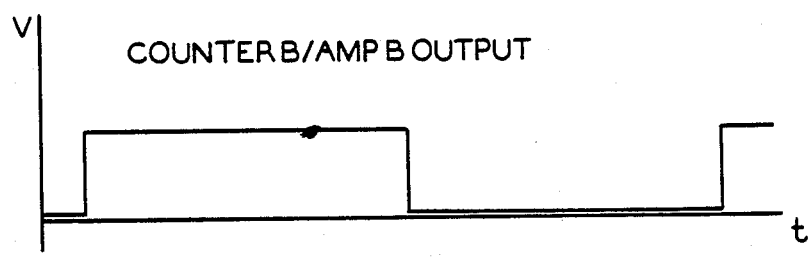
FIG. 5c is a graphical representation of the output of the second counter/amplifier circuit.
Figure 5D:
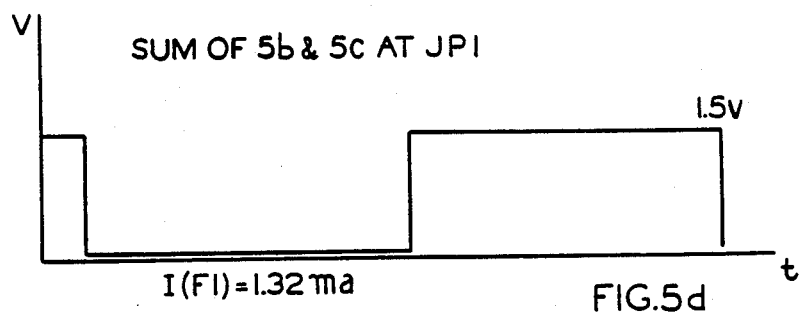
FIG. 5d is a graphical representation of the summed total of the first and second counter outputs.

An overload protection device (shown representatively as block 10) is disposed in series with the output of the summing means 9 such that, in the event of a drifting of either output count signal from the first and second counter circuits 3, 4, the resultant summed output signal from the summing means 9 will exceed the magnitude of that shown in FIG. 5d, thereby activating the overload protection device 10 and shutting down the vital power inverter. The time period required to activate the overload protection device 10 is a function of the amount of drift away from the selected output frequency; if the drift is significant, the overload protection device will be activated in a relatively short time. This is accomplished by the fact that, the overload protection device 10 is current-responsive; and, as one count signal drifts further away from another, the phase difference contributes and causes a higher amplitude output count signal from the summing means 9, thereby resulting in a larger current flowing through the overload protection device 10.

Figure 4:
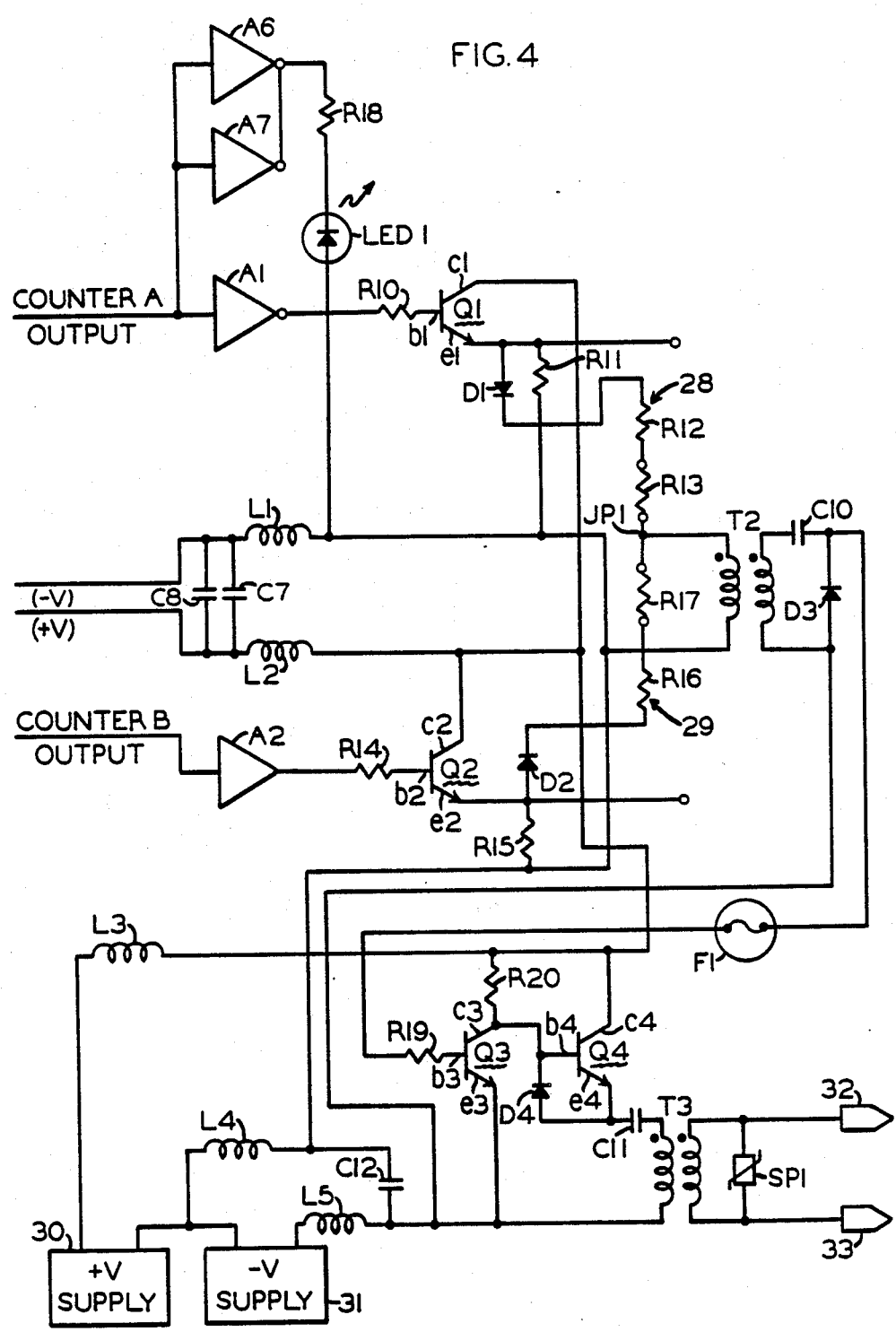
FIG. 4 is an elevational view, in circuit diagram form, of a third portion of the vital power inverter shown in FIG. 1.

Under normal operating conditions, the output of the summing means 9 will pass through the overload protection device 10 to an a.c. output drive circuit 11 which conditions the count output signal such that, the a.c. powered phase selective railroad equipment (not shown) can be operated thereby. The a.c. output drive circuit 11 also contains line-conditioning devices, which are shown in FIG. 4, and which will be described hereinafter in further detail. The input power used to operate the vital power inverter is obtained from d.c. batteries (not shown) which are used extensively at railroad signalling installations. The battery voltage is fed to a power supply circuit (shown representatively as block 12). The power supply circuit 12 converts the battery voltage to a voltage usable by the digital electronic devices generally making up the various circuits of the vital power inverter, such voltage typically being plus (+) and minus (−) 5 volts.

The vital power inverter also contains a power monitor/reset circuit (shown as block 13) which serves to reset the digital logic following system initialization. The hereinabove-described circuits and blocks will now be described in terms of circuit components, wherein the block diagrams of FIG. 1 are expanded to be shown in FIGS. 2, 3, and 4.

Figure 2:
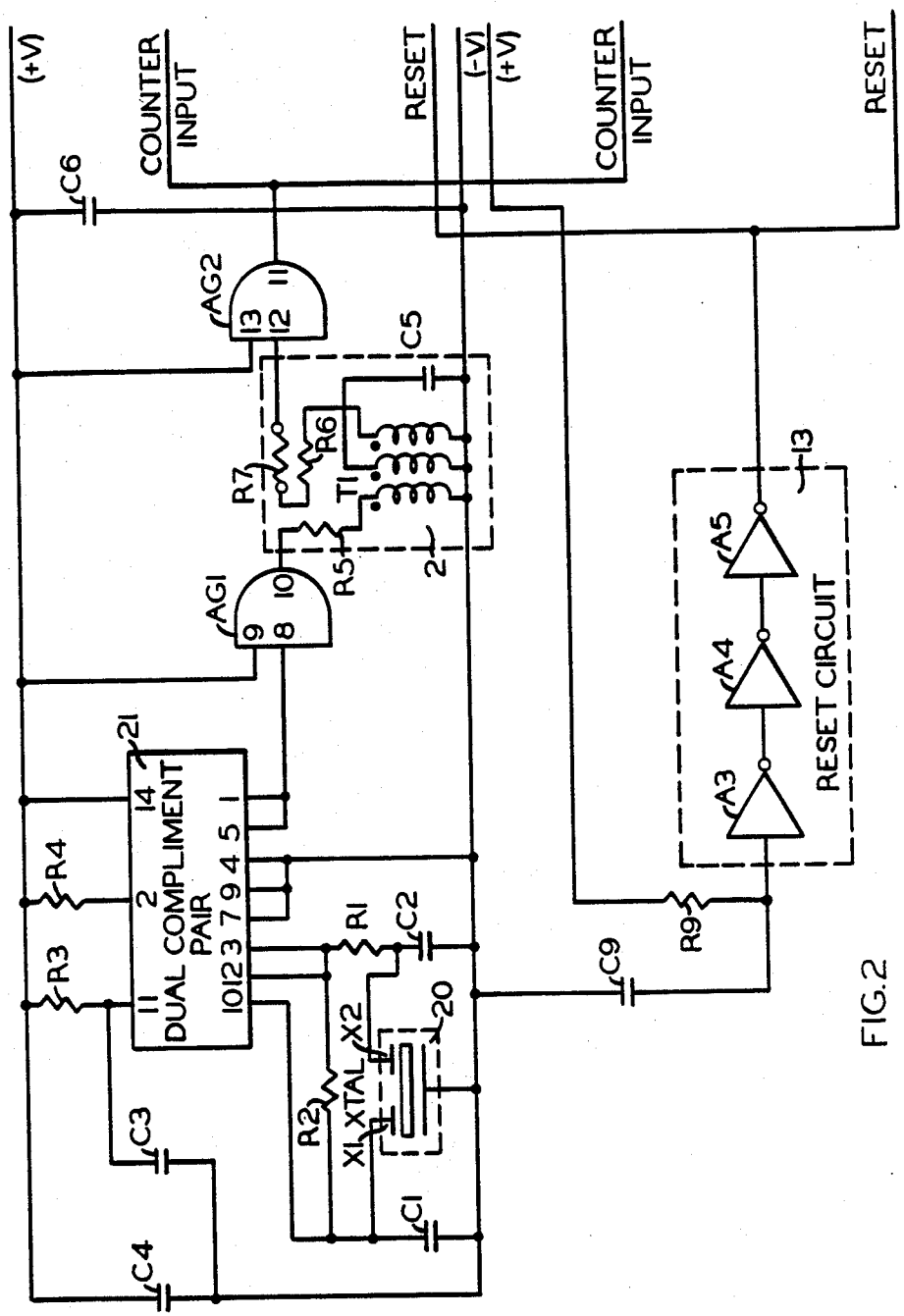
FIG. 2 is an elevational view, in circuit diagram form, of a portion of the vital power inverter shown in FIG. 1.

As seen in FIG. 2, the vital power inverter includes a crystal oscillator element 20 which, in this instance, is a quartz tuning fork crystal, but which can be substituted for by other known oscillator devices. A first phase shift capacitor C1 is connected at one end to the input of the crystal oscillator element 20, and at the other end to the output terminal X1 of the oscillator element 20. A second phase shift capacitor C2 is connected in a similar fashion across the oscillator input and a second output terminal X2 of the oscillator element 20. The capacitive values of the first and the second phase shift capacitors C1 and C2 are selected to provide a 60 kilohertz pierze-type oscillator. The second phase shift capacitor, in order to compensate for stray capacitances arising from the layout of the components on the circuitboard (not shown,) should be a variable capacitor with a typical capacitance value of 5 picofarads, proving adequate for the chosen frequency and architecture when the first phase shift capacitor C1 has a chosen fixed capacitive value of 10 picofarads.

The output of the crystal oscillator element 20, taken across terminals X1 and X2, is then coupled through two resistors R1 and R2 to the input of a dual complementary air digital electronic component 21. This complementary pair component 21 acts to drive the output of the oscillator element 20 to the remaining circuit elements in the vital power inverter. The complementary pair element 21 is biased by third and fourth resistive elements R3, R4 and third and fourth capacitive elements C3, C4 connected according to known techniques.

The output of the complementary pair element 21 is passed to a first AND gate AG1, and from the first AND gate AG1 to the series-tuned filter 2 where, due to the tuning of the filter, which includes a transformer arrangement T1 as well as resistors R5, R6, and R7 and tuning capacitor C5, the correctness of the output frequency of the crystal oscillator 20 can be checked to a precise degree. The actual inductive, resistive, and capacitive values for the elements of the series-tuned filter 2 can be selected according to the degree of precision required with at least one of the elements being variable to compensate for low tolerances of the components; in this case, the variable element being resistor R7. In the event of drift away from oscillator frequency greater than the preselected allowed range monitored by the series-tuned filter 2, the output of the series tuned filter 2 is reduced significantly, effectively shutting down the vital power inverter.

Under normal operating conditions, the series-tuned filter 2 will pass the output signal of the crystal oscillator element 20 through resistor R6 and the variable resistance R7 and to a second AND gate AG2.

This second AND AG2 effectively buffers the signal passed through the series-tuned filter 2 such that, the oscillator signal can be passed simultaneously to the first and second counter circuits 3, 4.

Figure 3:
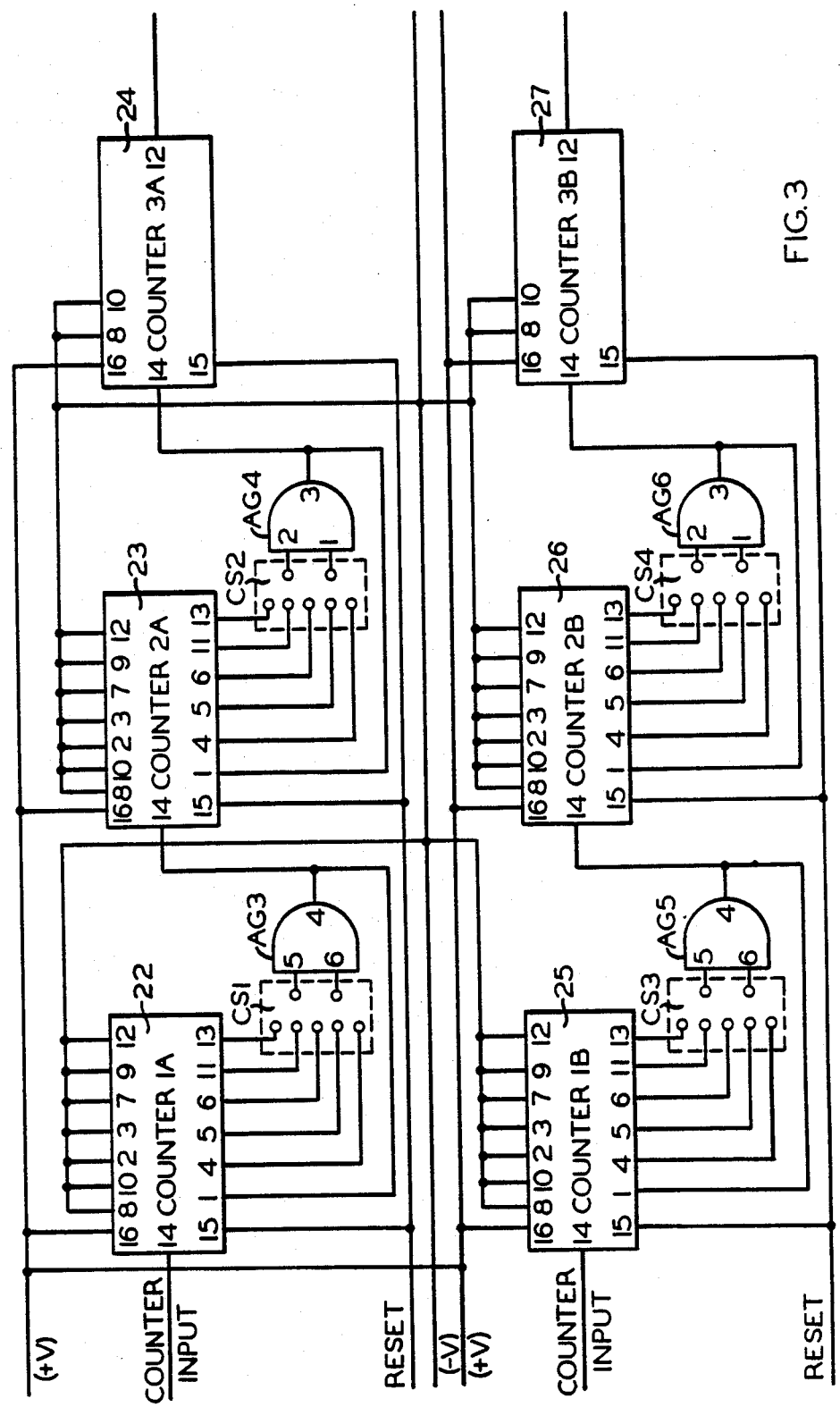
FIG. 3 is an elevational view, in circuit diagram form, of a second portion of the vital power inverter shown in FIG. 1.

As seen in FIG. 3, the first and second counter circuits 3, 4 are each comprised of a plurality of presettable, divide-by-N counters, the exact number of counters needed being determined by a desired range of final count outputs and the oscillator frequency input thereto. In this instance, a range of output counts between 60 and 100 hertz is desired and can be obtained by selecting certain counter-jumper configurations using the count-select elements CS1 through CS4 (shown in FIG. 3) and the first two stages associated with each of the first and second counter circuits 3, 4.

The first counter circuit 3 is made up of three such presettable, divide-by-N counters 22, 23, and 24 which are connected sequentially such that the divide capabilities of each counter is used in a cumulative manner. As seen in FIG. 3, the output of the first counter element 22 is fed to the first count-select element CS1 and through a thrid AND gate AG3 to the clock input of the second counter element 23. Similarly, the output of the second counter element 23 is fed through the second count-select element CS2, through a fourth AND gate AG4, into the clock input of a third counter element 24. The previously-described three counter elements can each contain five counter stages therewithin such that, a divide-count from 2 to 10 can be obtained by selection of the appropriate count-select jumper configuration. Or, alternatively, any one of the counters can be a fixed count counter, as is shown for the third counter 24; it can be appreciated therefore that a number of counter configurations can be used for the counter circuits 3, 4. In this manner, it can be appreciated that a 60 kilohertz clock input to the first counter element 22 can effect a count output as low as 60 hertz and as high as 750 hertz, assuming the lowest divide-count 2 were selected for each counter.

As further seen in FIG. 3, the second counter circuit 4 includes like elements, laid out in an identical fashion to those of the first counter circuit 3. The second counter circuit 4 includes three counter elements, identified as the fourth through sixth counter elements 25, 26, and 27, and arranged in the same manner as the first and third counter elements 22, 23, and 24 of the first counter circuit 3; that is, with the third and fourth count-select elements CS3 and CS4 and the fifth and sixth AND gates AG5 and AG6 arranged between the three count elements 25, 26, and 27. As was true for the first counter circuit 3, the outputs of the fourth and fifth counter elements 25, 26 of the second counter circuit 4 are fed into the inputs of the fifth and sixth counter circuits 26, 27, respectively. Additionally, the count-select jumper configuration utilized with respect to the first counter circuit 3 must be duplicated for the count-select jumper configurations of the second counter circuit 4. By arranging the third and fourth count-select elements CS3 and CS4 the same as the first and second count-select elements CS1 and CS2, and by virtue of the first and fourth counter elements 22 and 25 receiving the identical input clock pulse, the output count signals of the first and second counter circuits 3, 4 will be identical.

As seen in FIG. 4, identical output count signals generated within the first and second counter circuits 3, 4 are fed separately through respective, dedicated inverting and noninverting amplifiers A1 and A2, thereby resulting in the amplitude and frequency of such two output count signals remaining identical but the phase being in 180° opposing phase relation, which output count signal distinction can be seen as represented in the graphs of FIGS. 5b and 5c.

The inverted output count signal channel A, which is the first counter circuit 3, is coupled from the output of the inverting first amplifier A1 to the driver A circuit 7. The driver A circuit 7 includes a first transistor Q1, arranged in an emitter follower configuration, whereby the inverted output count signal provides the base current to the base terminal b1 of the first transistor Q1 through a first biasing resistor R10. The collector terminal c1 of the first transistor Q1 is coupled to the positive supply voltage (+V) such that, when the positive portion of the inverted count signal is present, the first base terminal b1 of the first transistor Q1 is turned ON. With the first transistor Q1 thus turned ON, current flows through a first emitter terminal e1 of the first transistor Q1 through a first blocking diode D1, oriented to allow the current to flow from the first transistor Q1 then to the summing means 9. In a similar manner, the noninverted output count signal channel B, which is the second counter circuit 4, is coupled from the output of the noninverting amplifier A2 to the driver B circuit 8. The driver B circuit 8 includes a second transistor Q2, arranged in an emitter follower configuration, whereby the noninverted output count signal provides (when in the positive voltage condition) the base current to a second base terminal b2 associated with the second transistor Q2 through a second biasing resistor R14. The second collector terminal c2 of the second transistor Q2 is also coupled to the positive voltage supply (+V) such that, when the second transistor Q2 is turned ON for the positive portion of the noninverted output count signal, current flows to the emitter terminal e2 of the second transistor Q2 through a second blocking diode D2, also oriented to allow current flow through the second transistor Q2 then to the summing means 9.

The summing means 9 includes a first series-resistance arrangement 28 associated with the inverted first output count signal and a second series-resistance arrangement 29 associated with the second output count signal. The first and second series-resistance arrangements 28, 29 are additionally arranged in series relation to one another, with a lead from the junction point JP1 therebetween being taken to one terminal of the primary winding of a summing transformer T2.

The resistance values for each of the first and second series-resistance arrangements 28, 29 are selected such that, though the inverted and noninverted input count signals are equal in amplitude, but 180° out of phase, the addition of such two signals by the summing means 9 results in a measurable output signal capable of driving the a.c. driver circuit 11; but yet, small enough to avoid activating the overload protection circuit 10.

As an example of the resistance value selection that can be made to result in an output pulse of the summing means having a positive voltage level of 1.5 volts and a current capacity of 1.32 milliamps, and assuming an equivalent valued signal is present at the output of the driver circuits A and B, 9, 10, a value of 24 ohms can be used for a first dropping resistor R12 associated with the first series-resistance arrangement 28 and a value of 68 ohms can be used for a second dropping resistor R16 associated with the second series resistance arrangement 29. Each of the first and the second dropping resistors R12 and R16 has associated therewith, respectively, a first and a second adjusting resistor R13 and R17, which can be modified to compensate for low tolerances of the resistance values of the first and second dropping resistors R12, R16 such that the proper voltage-dropping ratio is maintained.

By selecting the first dropping resistor R12 to have a smaller resistive value, less voltage is dropped across this first dropping resistor R12 in comparison to that dropped across the second dropping resistor R16, thereby resulting in a summed output of the summing means 9 favoring the output count signal from the first counter circuit 3. The currents flowing through the respective first and second series-resistance arrangements 28, 29 therefore also reflect the weighting arrangement and difference between the current flowing through the first series-resistance arrangement 28 and that flowing through the second series-resistance arrangement 29. It can be appreciated that these resistive values are offered for illustration purposes only and that other values and weightings of values can be selected that would provide the desired output of a selected frequency output pulse of discernible amplitude but, of controlled current capacity.

The summing transformer T2 has the opposite end of the primary winding coupled to the negative voltage source (−V) and has the secondary winding, with a filtering capacitor C10, connected, in series, to such secondary winding and a blocking diode D3 connected in parallel to such secondary winding coupled to the overload protection circuit 10. As seen in FIG. 4, the overload protection circuit 10 consists of a precision fusing device connected, in series, with the positive connection of the secondary winding of the summing transform T2. Using the signal values of the heretofore-discussed example, if a 2 milliamp fuse were used for the precision fusing device F1 (under normal operating conditions) the output pulse of 1.5 volts and 1.32 milliamps will not blow the fuse F1.

The normal output pulse of the summing means 9 is then coupled to the a.c. driver circuit 11, which then outputs the desired frequency a.c. signal for operating the phase selective a.c. equipment (not shown) powered by the vital power inverter. The a.c. driver circuit 11 includes a third transistor Q3, configured as a common emitter, whereby the output of the summing means 9 provides the base current of the base terminal b3 of the third transistor Q3, thereby turning the third transistor Q3 ON. The a.c. driver circuit 11 also includes a fourth transistor Q4, configured as an emitter follower; and having the base terminal b4, associated therewith, connected with the collector terminal C3 of the third transistor Q3. The output of the emitter terminal e4 of the fourth transistor Q4 is connected, over a second coupling capacitor C11, to the positive side of the primary winding of the output transformer T3. A line suppression element SP1 is connected across the leads of the secondary winding of output transformer T3 to protect the circuits of the vital power inverter from line surges.

A positive voltage supply 30 and a negative voltage supply 31 are shown in FIG. 4 for converting the input battery voltage to a voltage usable by other circuits of the vital power inverter. It can be appreciated that the power source can be provided by a single unit having positive and negative voltage outputs instead of the two voltage supplies 30, 31 (shown in FIG. 4). Loading and filtering inductors and capacitors L1 and L2 and C7 and C8 are disposed on and between the positive and common voltage lines, according to known techniques. As seen in FIG. 2, a power monitor/reset circuit 13 is associated with the supply of positive voltage to the circuits of the vital power inverter. The reset circuit 13 is shown including three inverting amplifiers A3, A4 and A5, but can be substituted for by use of one inverting amplifier, which would provide the proper polarity reset signal to the first and second counter circuits 3, 4 during system initialization.

In operation, the vital power inverter produces the selected frequency a.c. voltage signal output upon introduction of the battery supply voltage to the positive and negative voltage supplies 30, 31. Crystal oscillator element 20 is powered thereby and begins outputting the 60 kilohertz a.c. signal immediately thereafter. The oscillator driver complementary pair element 21 receives the output of the crystal oscillator element 20 and conditions this a.c. signal to be used by the various gates and circuits of the vital power inverter. The a.c. signal is then passed through a first buffer-type AND gate AG 1 to the series-tuned filter 2, which ensures that the crystal oscillator element 20 is outputting an a.c. frequency within a selected tolerance; which, in this case, is 1200 hertz of the desired crystal frequency of 60 kilohertz. If the crystal frequency has drifted more than 1200 hertz from the desired output, the series-tuned filter 2 only passes a signal of such reduced magnitude that, when communicated to a second buffering AND gate AG2, results in a zero output from the second buffering AND gate AG2, thereby preventing the crystal oscillator 20 output from operating the vital power inverter. Under normal conditions, the crystal oscillator 20 output is within the preselected frequency and the series-tuned filter 2 passes the signal to the second buffering AND gate AG2. The output of the second buffering AND gate AG2 is fed simultaneously to the first and fourth counter elements 22 and 25 of the repective first and second counter circuits 3, 4. The first and second counter circuits 3, 4, by way of identically configured count select elements CS1, CS2, CS3 and CS4, count down the input 60 kilohertz a.c. signal from the crystal oscillator element 20 to the same final frequency which may be from 60 to 750 hertz.

The output of the first counter circuit 3 is then fed to a noninverting first amplifier A1 and then to a first drive A circuit 7. Similarly, the output of the second counter circuit 4 is fed to an inverting second amplifier A2 and then to a second driver B circuit 8. At this time, as seen in FIGS. 5b and 5c, the outputs of the first and second counter circuits are identical in amplitude and frequency, but are 180° out of phase with respect to each other. These two identical, but out of phase, signals are then coupled to respective first and second series-resistance arrangements 28, 29, which are themselves connected together, in series, with the lead taken therebetween to the positive side of a primary winding of the summing tranformer T2; such connected first and second series-resistance arrangements being configured in the form of a current summing network.

In order to pass the usable signal through the summing transformer T2, the output of the first counter circuit 3 is weighted differently than that of the second counter circuit 4; that is, more current flows through the first series-resistance arrangement 28 than flows through the second series-resistance arrangement 29. As such, under normal operating conditions (that is, where the sum of the outputs of the first and the second driver circuits A and B is as shown in FIG. 5c) an a.c. signal output from the summing transformer T2 will be large enough to activate the a.c. driver circuit 12, yet small enough in current capacity to prevent blowing the fusing element F1.

In the event of a fault condition, in either the channel A or B logic sequence, however, the signal at the junction point between the first and second series-resistance arrangements 28 and 29 will heterodyne with respect to one another. As the result of the frequency difference between the two channels, channel A at some point, pending the beat frequency resulting from the heterodyne effect, will be in phase with channel B, thereby causing the net current flowing through the summing transformer T2 to increase and thus also the current to the fusing element F1 to be in excess of the capacity of the fusing element F1. Using the signal values of the heretofore-detailed example, two milleamp fuses will blow, thus opening the connection to the a.c. driver circuit 11, in a matter of minutes, when there is a slight percentage difference between the countdown frequencies of the first and second counter circuits 3, 4. At this point, the vitality of the vital power inverter is ensured since there will be no signal at the output terminals 32, 33.

The vitality of the vital inverter driver can best be illustrated here by way of an example where it can be noted that, when either input to the buffering stages 5, 6, 7 or 8 or to the summing means 9 becomes disconnected, the current through the overload protection means 10 is approximately doubled, thereby causing a device shutdown. This condition prevents the vital inverter driver from outputting on the chance that such error resulted from a frequency shift caused by a failed component or connection associated with one count signal, even though the circuitry generating the other count signal may have operated properly.

An operation indicating circuit can be provided, as shown in FIG. 4, whereby the counter A output is fed to two parallel-arranged inverting amplifiers A6 and A7, with the output driven through resistor R18 and serving to turn ON and OFF the correct operation of the counter A circuit 3. It will also be noted that the biasing of transistors Q1, Q2, Q3 and Q4 is accomplished using known techniques and circuit elements.

Although the hereinabove form of the invention constitutes a preferred form, it can be appreciated that other modifications can be made thereto without departing from the scope of the invention as set forth in the appended claims.

I claim:

1. A vital inverter driver for providing a vital preselected frequency a.c. signal output from a d.c. voltage source comprising:
    (a) oscillator means activated by such d.c. voltage source for generating an a.c. signal having an accurate frequency segment;
    (b) first frequency-reducing means coupled to said oscillator means for counting down such a.c. signal to a first predetermined count output signal;
    (c) second frequency-reducing means coupled to said oscillator means for counting down such a.c. signal to a second predetermined count output signal, such second predetermined count output signal being equivalent in frequency to such first predetermined count output signal;
    (d) a first amplifier coupled to said first frequency-reducing means, said first amplifier being effective such that, the polarity of such first predetermined count output signal is conditioned to a first polarity thereby;
    (e) a second amplifier coupled to said second frequency-reducing means, said second amplifier being effective such that, the polarity of such second predetermined count output signal is conditioned to a polarity 180° opposite to that of such amplified first predetermined count output signal thereby;
    (f) summing means coupled to said first and second amplifier members for alegbraically combining such first predetermined count output signal and such second predetermined count output signal, said summing means including a first series-resistance arrangement coupled to said first amplifier and a second series-resistance arrangement coupled to said second amplifier, said first and second series-resistance arrangements having first and second resistance values associated therewith, such first and second series-resistance values differing such that, under normal operating conditions, one of such first and second predetermined count output signals contributes a positive portion to a summing means output signal; and
    (g) overload protection means coupled to said summing means for shutting down such summing means output signal when such summing means output signal exceeds a predetermined magnitude, said overload protection means effectively passing such summing means output signal when such first and second predetermined count output signals contributes to such summing means output signal such as corresponds to such first and second predetermined count output signals being identically 180° out of phase.

2. A vital inverter driver, as set forth in claim 1, further comprising a series-tuned disposed between said oscillator means and said first and second frequency-reducing means, said series-tuned filter being effective such that, in the event the frequency of said a.c. signal from said oscillator means drifts beyond a predetermined amount from the selected frequency of said oscillator means, such a.c. signal is prevented from communicating to said first and second frequency-reducing means.

3. A vital inverter driver, as set forth in claim 1, wherein said oscillator means includes a tuning fork-type crystal oscillator having a first and a second phase shift capacitor connected respectively in parallel across a single input and one of two outputs of said crystal oscillator.

4. A vital inverter driver, as set forth in claim 3, further comprising an oscillator driver coupled to said two outputs of said crystal oscillator such that, such a.c. signal output can be driven to a suitable output level to operate said first and second frequency-reducing means.

5. A vital inverter driver, as set forth in claim 3, further comprising a first buffering AND gate connected between said oscillator driver and the input of said series-tuned filter, and a second buffering AND gate connected between the output side of said series-tuned filter and said first and second frequency-reducing means.

6. A vital inverter driver, as set forth in claim 1, wherein said first frequency-reducing means includes a first plurality of stepped-down counters connected in series.

7. A vital inverter driver, as set forth in claim 6, wherein said second frequency reducing means includes a second plurality of stepped-down counters connected in series, said second plurality of stepped-down counters being equivalent in number to said first plurality of stepped-down counters.

8. A vital inverter driver, as set forth in claim 6, further comprising a first plurality of count-select, jumper arrangements associated with said first plurality of stepped-down counters and a second plurality of count-select, jumper arrangements associated with said second plurality of stepped-down counters; said first and second pluralities of count-select, jumper arrangements being adjustable such that, a range of stepped-down frequency counts can be obtained from said first and second pluralities of stepped-down counters.

9. A vital inverter driver, as set forth in claim 7, further comprising a power monitor, reset circuit coupled to such d.c. voltage source on one end and to a reset input associated with each of said first and second pluralities of stepped-down counters, said power monitor, reset circuit including an odd number of inverting amplifiers effective such that, upon initial energization of said vital inverter driver, a reset signal is generated, setting all of said first and second pluralities of stepped-down counters to a zero (0) count.

10. A vital inverter driver, as set forth in claim 7, wherein said summing means includes a summing transformer having a positive side of the primary winding coupled to such series connection between said first and second series-resistance arrangements and a secondary winding associated with said primary winding coupled to said overload protection means.

11. A vital inverter driver, as set forth in claim 10, further comprising a first driver circuit connected between the output of said first frequency-reducing means in said first amplifier, and a second driver circuit connected between the output of said second frequency-reducing means and said second amplifier, said first and second driver circuits conditioning said first and second predetermined count output signals for use by said summing means.

12. A vital inverter driver, as set forth in claim 11, further comprising an a.c. output driver circuit coupled to said overload protection means such that, such summing means output signal can be conditioned for use at a pair of output terminals.

13. A vital inverter driver, as set forth in claim 1, wherein said summing means includes a summing transformer having a positive side of the primary winding coupled to such series connection between said first and second series-resistance arrangements, and a secondary winding associated with said primary winding coupled to said overload protection means.

14. A vital inverter driver, as set forth in claim 13, wherein said overload protection means includes a fusing element connected in series with the positive side of said secondary winding of said summing transformer.

15. A vital inverter driver, as set forth in claim 13, further comprising an a.c. output driver circuit coupled to said overload protection means such that, such summing means output signal can be conditioned for use at a pair of output terminals.

16. A vital inverter driver, as set forth in claim 15, wherein said overload protection means includes a fusing element connected in series with such positive side of said secondary winding of said summing transformer.

17. A vital inverter driver, as set forth in claim 1, further comprising a first driver circuit connected between the output of said first frequency-reducing means and said first amplifier, and a second driver circuit connected between the output of said second frequency-reducing means and said second amplifier, said first and second driver circuits conditioning said first and second predetermined count output signals for use by said summing means.

18. A vital inverter driver, as set forth in claim 17, wherein said first and second driver circuits, having respective first and second drive transistors, are each arranged in an emitter-follower configuration whereby said first and second predetermined count output signals are coupled to first and second base terminals of said first and second driver transistors, respectively.

19. A vital inverter driver, as set forth in claim 17, wherein said first and second driver circuits are biased such that, in the event of a disconnection between said oscillator means and said summing means, such summing means output signal wil exceed such predetermined magnitude, thereby activating said overload protection means.

20. A vital inverter driver, as set forth in claim 1, wherein such summing means output signal exceeds such predetermined magnitude when more than one of such first and second predetermined count output signals contributes simultaneously to such summing means output signal as corresponds to such first and second predetermined count output signals being other than 180° out of phase.

* * * * *

UNITED STATES PATENT AND TRADEMARK OFFICE
CERTIFICATE OF CORRECTION

PATENT NO. : 4,652,986
DATED : March 24, 1987
INVENTOR(S) : Dick J. Kolkman

It is certified that error appears in the above-identified patent and that said Letters Patent are hereby corrected as shown below:

Column 10, Claim 1(g), line 26, delete "such", first occurrence

Column 10, Claim 2, line 30, after "series-tuned", insert

--filter--

Signed and Sealed this

Eighth Day of September, 1987

Attest:

DONALD J. QUIGG

Attesting Officer

Commissioner of Patents and Trademarks